United States Patent
Colling et al.

(10) Patent No.: US 6,830,691 B2
(45) Date of Patent: Dec. 14, 2004

(54) PROCESSES USING SOLID PERM-SELECTIVE MEMBRANES IN MULTIPLE GROUPS FOR SIMULTANEOUS RECOVERY OF SPECIFIED PRODUCTS FROM A FLUID MIXTURE

(75) Inventors: Craig W. Colling, Warrenville, IL (US); George A. Huff, Jr., Naperville, IL (US); John V. Bartels, Chicago, IL (US)

(73) Assignee: BP Corporation North America Inc., Warrenville, IL (US)

( * ) Notice: Subject to any disclaimer, the term of this patent is extended or adjusted under 35 U.S.C. 154(b) by 193 days.

(21) Appl. No.: 10/185,825

(22) Filed: Jun. 27, 2002

(65) Prior Publication Data

US 2004/0004040 A1 Jan. 8, 2004

(51) Int. Cl.[7] .............................................. B01D 61/00
(52) U.S. Cl. ............................. 210/641; 95/45; 95/50
(58) Field of Search ..................... 210/651, 652, 210/640, 641; 95/45, 50

(56) References Cited

U.S. PATENT DOCUMENTS

| | | | | |
|---|---|---|---|---|
| 2,159,434 A | * | 5/1939 | Frey | 210/640 |
| 4,857,078 A | * | 8/1989 | Watler | 95/50 |
| 5,032,148 A | * | 7/1991 | Baker et al. | 95/50 |
| 5,670,051 A | * | 9/1997 | Pinnau et al. | 210/651 |
| 5,772,733 A | * | 6/1998 | Lokhandwala et al. | 95/39 |

* cited by examiner

*Primary Examiner*—Ana Fortuna
(74) *Attorney, Agent, or Firm*—Ekkhard Schoettle; Fred S. Jerome

(57) ABSTRACT

Economical processes of the present invention are for separation of fluid mixtures to recover desired products using apparatus comprising a plurality of membrane modules disposed in a first product group, a second product group, and optionally one or more intermediate group. Advantageously integrated processes of the invention with the membrane modules in multiple groups are employed for simultaneous recovery of a very pure permeate product and a desired non-permeate product from a mixture containing organic compounds.

17 Claims, 4 Drawing Sheets

PROCESSES USING SOLID PERM-SELECTIVE MEMBRANES IN MULTIPLE GROUPS FOR SIMULTANEOUS RECOVERY OF SPECIFIED PRODUCTS FROM A FLUID MIXTURE

TECHNICAL FIELD

The present invention relates to novel processes for separation of fluid mixtures. Broadly, intergrated processes of the invention comprise a plurality of separations using solid perm-selective membranes. More particularly, the invention relates to recovery of specified products using a plurality of membrane modules disposed in a first product group, a second product group, and optionally one or more intermediate group. Processes of the invention with the membrane modules in multiple groups are beneficially useful for simultaneous recovery of a very pure permeate product and a desired non-permeate product from a mixture containing organic compounds.

BACKGROUND OF THE INVENTION

Light hydrocarbons serve as the building blocks for the production of numerous chemicals. Ethylene, a light olefin composed of two carbon atoms joined by a double bond, is used in the production of several chemicals including polyethylene, ethylene oxide, ethylene dichloride, and ethylbenzene. Propylene, a light olefin composed of three carbon atoms where two of the carbon atoms are joined by a double bond, is used in the manufacture of polypropylene, acrylonitrile, oxo alcohols, cumene, and propylene oxide. Light hydrocarbons composed of four carbon atoms are used, for example, in the production of synthetic rubbers and elastomers, sec-butyl alcohols, maleic anhydrides, polybutenes, and clean motor fuels (e.g. alkylate).

These light hydrocarbons have traditionally been produced by steam or catalytic cracking. Oxygenate conversion (e.g. methanol to olefins), dehydrogenation, and isomerization routes have also grown in recent years as important production routes. Separation costs are a significant fraction of the overall costs of making these petrochemicals. When the valuable light hydrocarbons are produced, they are often accompanied by the production of other compounds that must be removed. For example, when propylene is produced in the presence of hydrogen, it is often produced in conjunction with propane. Generally, it is required to remove the propane before propylene can be used to produce more valuable products. However, many of the desirable light hydrocarbons are produced with compounds that have boiling points that are very similar to those of the desirable light hydrocarbons. These separations then become very expensive and energy intensive. For example, a typical ethylene separation section of an ethylene plant requires cryogenic conditions to achieve the required ethylene purity. A propane/propylene splitter requires so many separation stages that it is typically done in two large towers each containing more than 100 trays.

Processes that enable the concentration and recovery of these desirable light hydrocarbons without expensive distillation steps have been sought for many years.

In U.S. Pat. No. 3,758,603 and 3,864,418 R. Hughes and E. Steigelmann describe the use of membranes in conjunction with metal complexing techniques to facilitate the separation of ethylene from ethane and methane. Similar metal complex and membrane hybrid processes have been described by R. Yahnke in U.S. Pat. No. 4,060,566, by M. Kraus in U.S. Pat. No. 4,614,524, and by R. Valus in U.S. Pat. No. 5,057,641. These processes utilize a separation unit containing a membrane having a feed side and a permeate side with a liquid between them that contains a metal-containing ion complexing agent. Transport of the desired component is described as occurring by a) dissolving the component in the facilitator liquid on the feed side of the membrane; b) forming a component-carrier complex; c) diffusing the complex to the permeate side of the membrane; and d) releasing the component from the carrier. The selectivity of the membrane is maximized by choosing a complexing agent with a high affinity for the desired component. The agent facilitates the transport of the desired component from the feed stream to the permeate.

Evaluation of a facilitated transport membrane process for the separation of propylene from propane is described by J. Davis et al. in an article entitled "Facilitated Transport Membrane Hybrid Systems for Olefin Purification" published in Sep. Sci. Tech 28, 463–476 (1993). Davis et al. used a silver nitrate solution in a hybrid membrane system to obtain selectivities for propylene transport that were in excess of 150.

D. Gottschlich and D. Roberts examined hybrid systems consisting of a distillation column and a facilitated transport membrane separation module in paper for SRI Project 6519 and DOE Contract Number DE-AC07-761D01570 entitled "Energy Minimization of Separation Process Using Conventional/Membrane Systems" (1990). They compare the effectiveness of several arrangements of facilitated transport membranes and distillation processes.

R. Noble and co-workers in two articles entitled "Analysis of a Membrane/Distillation Column Hybrid Process" published in J. Memb. Sci. 93, 31–44 (1994) and "Design Methodology for a Membrane/Distillation Column Hybrid Process" published in J. Memb. Sci.99, 259–272 (1995) discuss the design and optimization of several combined membrane and distillation processes for the separation of propylene and propane. Their work focuses on the placement of the membrane around the distillation column in order to obtain an efficient process that accomplishes the desired separation.

Friesen et al. describe the use of a membrane system to separate propylene from propane in European Patent Application 0701856A1 where the flux of propylene through the membrane has been enhanced by the use of a condensable sweep gas on the permeate side of the membrane. They present examples for a membrane that illustrate the effect of sweep gas rate on propylene flux.

Handbooks and review articles on membrane separation processes extol the simplicity and efficiency of membranes. However, the prior art for using membranes to separate desirable hydrocarbons (e.g. olefins) out of complex mixtures only considers the use of membranes in hybrid systems, where membranes have been combined with facilitating liquids or distillation columns. These other separation processes have inherent difficulties that could undermine their coupling with membranes. For example, the metal complexing agents described above are often very susceptible to poisoning. A. Sungpet et al. state in an article entitled "Separation of Ethylene from Ethane Using Perfluorosulfonic Acid Ion-Exchange Membranes" published in ACS Symposium Series "Chemical Separations with Liquid Membranes," 270–285 (1996) that the selectivity and permeability of membranes for the separation of hydrocarbon mixtures, such as olefins from paraffins, is too low to be attractive, so membranes have been combined with other separation processes to achieve the desired separation. However if a membrane material was developed with sufficient permeability and selectivity where it could be used without other separation steps, it is not clear how to utilize the material in an industrial process. Detailed designs and evaluations of processes where the separation of desirable hydrocarbons is accomplished only by membranes are lacking. An understanding of the effect of membrane selectivity and process configuration on the energy and amount of membrane area required to separate desirable hydrocarbons out of complex mixtures is needed.

There is a present need for processes and apparatus using perm-selective membranes for simultaneous recovery of a very pure permeate product and a desired non-permeate product, in contrast to by-product, waste streams, in particular, processes which do not have the above disadvantages. A further object of the invention is to provide inexpensive processes and apparatus for the efficient separation of chemical compounds from mixtures which are difficult to separate, e.g., separation of propane-propylene by fractional distillation.

Improved processes should provide for an integrated sequence, carried out with streams in gas and/or liquid state, using a suitable perm-selective membranes, preferably a solid perm-selective membrane which under a suitable differential of a driving force exhibits selective permeability of a desired product. Advantageously, processes using perm-selective membranes for simultaneous recovery of a very pure permeate product and a desired non-permeate product shall avoid or minimize formation of unwanted by-products, waste streams. Beneficially, an improved separation processes shall efficiently employ perm-selective membranes having the same or different pre-selected permeabilities, and with optimum distribution between stages so as to efficiently produce very high purity product.

SUMMARY OF THE INVENTION

Economical processes of the present invention are for separation of fluid mixtures to recover desired products with apparatus using solid perm-selective membranes. More particularly, this invention relates processes using apparatus comprising a plurality of membrane modules disposed in a first product group, a second product group, and optionally one or more intermediate group. Advantageously intergrated processes of the invention with the membrane modules in multiple groups are employed for simultaneous recovery of a very pure permeate product and a desired non-permeate product from a mixture containing organic compounds.

This invention contemplates the treatment of a fluid feedstock, e.g. various type organic materials, especially a fluid mixture of compounds of petroleum origin. In general, the fluid feedstock is a gaseous mixture comprising a more selectively permeable component and a less permeable component. Processes of the invention are particularly useful in processes for treatment of a gaseous mixture comprised of a more selectively permeable alkene component and a corresponding alkane component.

Advantageously, processes according to the invention treat feedstreams which comprises a mixture of an alkane compound having from 2 to about 4 carbon atoms and an alkene compound having the same number of carbon atoms as the predominate component of the feedstream, e.g. the separation of propylene from propane.

In one aspect, the invention provides a process using perm-selective membranes in multiple groups for simultaneous recovery of a permeate product and a desired non-permeate product from a fluid mixture of compounds. The process comprises: providing a feedstream comprising a mixture of two or more compounds, providing apparatus comprising a plurality of membrane modules each including first and second zones separated by a solid perm-selective membrane which under a suitable differential of a driving force exhibits a permeability of at least 0.1 Barrer for one of the compounds of the feedstock, each first zone having at least one inlet and outlet for flow of fluid in contact with the membrane, and contiguous with the opposite side thereof a second zone having at least one outlet for flow of permeate, and the membrane modules of the apparatus are disposed in a first product group, a second product group, and at least one intermediate group, which intermediate group has membranes of higher selectivity than the membranes in at least one of the other groups, introducing the feedstream into the first zone of one or more of the intermediate modules under conditions suitable for permeation, and thereby obtaining permeate effluents and non-permeate streams from the intermediate modules, distributing the non-permeate streams from the intermediate modules into the first zone of one or more of the second product modules under conditions suitable for permeation, second product, collecting the permeate effluents from the second zones of the intermediate group of modules and distributing the permeates into the first zones of the first product group modules under conditions suitable for permeation, thereby obtaining non-permeate streams and final permeate product streams from the first product modules, and distributing the non-permeate streams from the first product modules into the first zone of one or more of the intermediate modules under conditions suitable for permeation.

Processes of the invention advantageously further comprises: collecting the permeate effluents from the second zones of the second product modules and distributing the permeates into the first zones of the first product group modules. In other aspects processes according to the invention further comprises: collecting the permeate effluents from the second zones of the second product modules and distributing the permeates into the first zones of the intermediate group of modules.

The means for collection and distribution of permeate effluents and permeate streams, advantageously comprises a compressor and/or a pump, preferably a compressor. Optionally, the apparatus may further comprises means for distribution of a "sweep" stream into the second zones one or more of the modules to improve recovery of the permeate effluents.

In another aspect, this invention provides a process using perm-selective membranes in multiple groups for simultaneous recovery of a permeate product and a desired non-permeate product from a fluid mixture of compounds, which process comprises: providing a feedstream comprising a mixture of two or more organic compounds, providing apparatus comprising a plurality of membrane modules disposed in a first product group, one or more intermediate group, and a second product group, each module comprising first and second zones separated by a solid perm-selective membrane which under a suitable differential of a driving force exhibits a permeability of at least 0.1 Barrer for one of the compounds of the feedstock, each first zone having at least one inlet and outlet for flow of fluid in contact with the membrane, and contiguous with the opposite side thereof a second zone having at least one outlet for flow of permeate, introducing the feedstream into the first zone of one or more of the intermediate modules under conditions suitable for permeation, and thereby obtaining permeate effluents and non-permeate streams from the intermediate modules, collecting the permeate effluents from the second zones of one or more of the intermediate group modules, and distributing the permeates into the first zones of the first product group modules, under conditions suitable for permeation, and thereby separating therefrom non-permeate effluents and final permeate product streams, distributing the non-permeate streams from one or more of the intermediate modules into the first zone of the second product modules under conditions suitable for permeation, and thereby obtaining permeate effluents and non-permeate second product streams from the second product modules, collecting the permeate effluents from the second zones of the second product modules, and distributing the permeates into the first zones of the first product group of modules, and distributing the non-permeate streams from the first product modules into the first zone of one or more of the intermediate modules.

Processes of the invention are particularly useful for treatment of a gaseous mixture comprised of a more selectively permeable alkene component and a corresponding alkane component, e.g. the feedstream comprises a mixture of an alkane compound having from 2 to about 4 carbon atoms and an alkene compound having the same number of carbon atoms as the predominate component of the feedstream. Generally, the mixtures have a liquid volume ratio of the alkene to the alkane compounds in a range upward from about 1 about 9. Advantageously, this ratio is in a range from about 1.25 to 8. Where the feedstream comprises a mixture of propylene and propane the liquid volume ratio of propylene to propane is in a range upward from about 1.5 to about 4, and more preferably the ratio is in a range from about 2 to about 3.

Typically, processes of the invention provide a first product of a more selectively permeable component and a corresponding less selectively permeable component having a liquid volume ratio of the more selectively permeable component to the less selectively permeable component in a range upward from about 10. Where the first product comprises a mixture of propylene and propane the liquid volume ratio of propylene to propane is in a range upward from about 14, and more preferably the ratio is at least 19.

According to the invention, the membrane modules in a group having membranes of about the same selectivity which selectivity is about the same, or may be critically different from that of the other group or groups. In one aspect of the invention the membrane modules in the second product group have membranes of lower selectivity than membranes in at least one of other group. Preferably, the membrane modules in the second product group have membranes of lower selectivity than membranes in the other groups.

In another aspect of the invention the membrane modules in at least a portion of the intermediate group have membranes of higher selectivity than membranes in at least one of the other groups. Advantageously, the membrane modules in the intermediate group have membranes of a selectivity which is about 35 percent or more higher than membranes another group, preferably at least about 50 percent higher, and more preferably at least about 100 percent higher. Preferably, the membrane modules in at least a portion of the intermediate group have membranes of higher selectivity than membranes in the other groups.

In other preferred embodiments, the membrane modules in the first product group have membranes of higher selectivity than membranes in at least one of the other groups. More preferably the membrane modules in the first product group have membranes of higher selectivity than membranes in the other groups.

This invention is particularly useful towards separations involving organic compounds, in particular compounds which are difficult to separate by conventional means such as fractional distillation. Typically, these include organic compounds are chemically related as for example alkanes and alkenes of similar carbon number.

According to the invention, under conditions suitable for permeation, the fluid in contact with the membranes in one or more of the module groups is liquid, gas, or a combination thereof.

In another aspect, this invention provides a process using perm-selective membranes in multiple groups for simultaneous recovery of a permeate product and a desired non-permeate product from a fluid mixture of compounds, which process comprises: providing a feedstream comprising a mixture of two or more organic compounds, providing apparatus comprising a plurality of membrane modules each including first and second zones separated by a solid perm-selective membrane which under a suitable differential of a driving force exhibits a permeability of at least 0.1 Barrer for one of the compounds of the feedstock, each first zone having at least one inlet and outlet for flow of fluid in contact with the membrane, and contiguous with the opposite side thereof a second zone having at least one outlet for flow of permeate, and the membrane modules of the apparatus are disposed in a first product group, a second product group, and at least one intermediate group, which intermediate group has membranes of higher selectivity than the membranes in at least one of the other groups, introducing the feedstream into the first zone of one or more of the intermediate modules under conditions suitable for permeation, and thereby obtaining permeate effluents and non-permeate streams from the intermediate modules, collecting the permeate effluents from the second zones of one or more of the intermediate group modules, and distributing the permeates into the first zones of the first product group modules, under conditions suitable for permeation, and thereby separating therefrom non-permeate effluents and final permeate product streams, distributing the non-permeate streams from one or more of the intermediate modules into the first zone of the second product modules under conditions suitable for permeation, and thereby obtaining permeate effluents and non-permeate second product streams from the second product modules, collecting the permeate effluents from the second zones of the second product modules, and distributing the permeates into the first zones of one or more of the intermediate group modules, and distributing the non-permeate streams from the first product modules into the first zone of one or more of the intermediate modules under conditions suitable for permeation.

In yet another aspect, this invention provides a process using perm-selective membranes in groups for simultaneous recovery of a permeate product and a desired non-permeate product from a fluid mixture of compounds, which process comprises: providing a feedstream comprising a mixture of two or more organic compounds, providing apparatus comprising a plurality of membrane modules disposed in a first product group and a second product group, each module comprising first and second zones separated by a solid perm-selective membrane which under a suitable differential of a driving force exhibits a permeability of at least 1 Barrer for one of the compounds of the feedstock, each first zone having at least one inlet and outlet for flow of fluid in contact with the membrane, and contiguous with the opposite side thereof a second zone having at least one outlet for flow of permeate, introducing the feedstream into the first zone of the first product group of modules under conditions suitable for permeation, and thereby obtaining non-permeate effluents and final permeate product streams from the first product modules, collecting the non-permeate effluents from the second zones of the first product group modules, and distributing the non-permeate streams into the first zone of the second product modules under conditions suitable for permeation, and thereby obtaining permeate effluents and non-permeate second product streams from the second product modules, and collecting the permeate effluents from the second zones of the second product group of modules, and distributing the permeates into the first zones of the first product group modules.

For a more complete understanding of the present invention, reference should now be made to the embodiments illustrated in greater detail in the accompanying drawing and described below by way of examples of the invention.

BRIEF DESCRIPTION OF THE DRAWINGS

The invention is hereinafter described in detail with reference to the accompanying drawings in which are schematic flow diagrams depicting preferred aspects of the multi-stage membrane separation processes and apparatus of the present invention for simultaneous recover a very pure permeate product and a desired non-permeate product from a fluid mixture of compounds.

GENERAL DESCRIPTION

Figure 1:
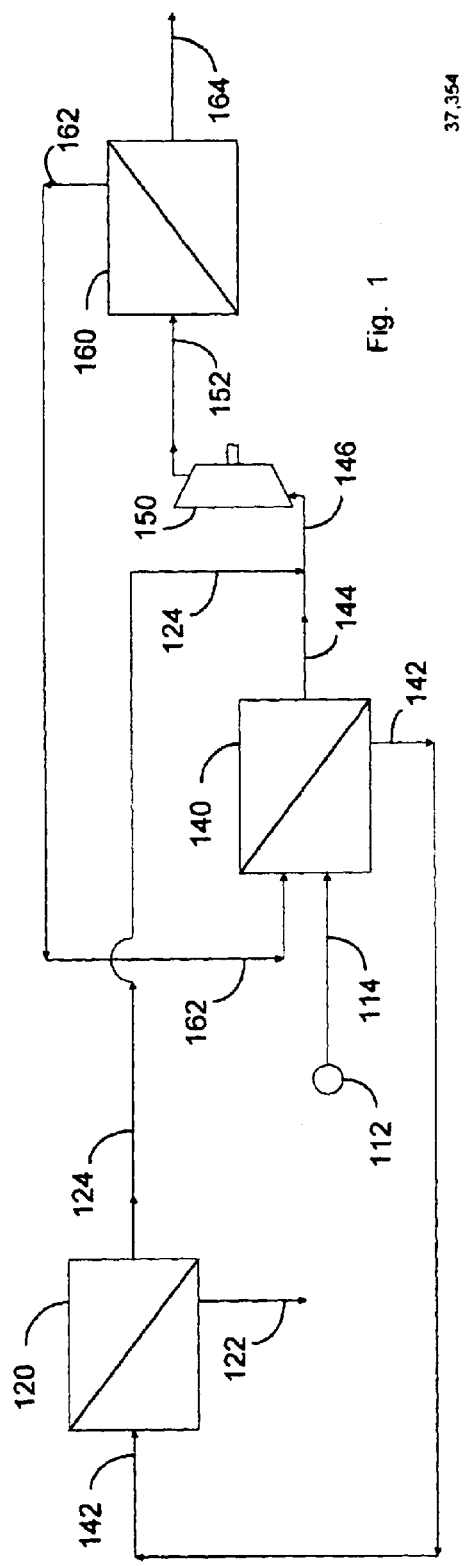
FIG. 1 is schematic drawing showing an embodiment of the present invention which includes three groups of perm-selective membrane modules, one feedstream location and one required compressor location.

Any solid perm-selective membrane which under a suitable differential of a driving force exhibits a permeability and other characteristics suitable for the desired separations may be used according to the invention. Suitable membranes may take the form of a homogeneous membrane, a composite membrane or an asymmetric membrane which, for example may incorporate a gel, a solid, or a liquid layer. Widely used polymers include silicone and natural rubbers, cellulose acetate, polysulfones and polyimides.

Preferred membranes for use in vapor separation embodiments of the invention are generally of two types. The first is a composite membrane comprising a microporous support, onto which the perm-selective layer is deposited as an ultra-thin coating. Composite membranes are preferred when a rubbery polymer is used as the perm-selective material. The second is an asymmetric membrane in which the thin, dense skin of the asymmetric membrane is the perm-selective layer. Both composite and asymmetric membranes are known in the art. The form in which the membranes are used in the invention is not critical. They may be used, for example, as flat sheets or discs, coated hollow fibers, spiral-wound modules, or any other convenient form.

The driving forces for separation of vapor components by membrane permeation include, predominately their partial pressure difference between the first and second sides of the membrane. The pressure drop across the membrane can be achieved by pressurizing the first zone, by evacuating the second zone, introducing a sweep stream, or any combination thereof.

The membranes used in each group of modules may be of the same type or different. Although both units may contain membranes selective to the desired component to be separated, the selectivities of the membranes may be different. For example, where intermediate modules process the bulk of the fluid feedstock, these modules may contain membranes of high flux and moderate selectivity. The module group which deals with smaller streams, may contain membranes of high selectivity but lower flux. Likewise the intermediate modules may contain one type of membrane, and product modules may contain another type, or all three groups may contain different types. Useful embodiments are also possible using membranes of unlike selectivities in the intermediate modules and product modules.

Suitable types of membrane modules include the hollow-fine fibers, capillary fibers, spiral-wound, plate-and-frame, and tubular types The choice of the most suitable membrane module type for a particular membrane separation must balance a number of factors. The principal module design parameters that enter into the decision are limitation to specific types of membrane material, suitability for high-pressure operation, permeate-side pressure drop, concentration polarization fouling control, permeability of an otional sweep stream, and last but not least costs of manufacture Hollow-fiber membrane modules are used in two basic geometries. One type is the shell-side feed design, which has been used in hydrogen separation systems and in reverse osmosis systems. In such a module, a loop or a closed bundle of fibers is contained in a pressure vessel. The system is pressurized from the shell side; permeate passes through the fiber wall and exits through the open fiber ends. This design is easy to make and allows very large membrane areas to be contained in an economical system. Because the fiber wall must support considerable hydrostatic pressure, the fibers usually have small diameters and thick walls, e.g. 100 μm to 200 μm outer diameter, and typically an inner diameter of about one-half the outer diameter A second type of hollow-fiber module is the bore-side feed type. The fibers in this type of unit are open at both ends, and the feed fluid is circulated through the bore of the fibers. To minimize pressure drop inside the fibers, the diameters are usually larger than those of the fine fibers used in the shell-side feed system and are generally made by solution spinning. These so-called capillary fibers are used in ultra-filtration, pervaporation, and some low- to medium-pressure gas applications.

Concentration polarization is well controlled in bore-side feed modules. The feed solution passes directly across the active surface of the membrane, and no stagnant dead spaces are produced. This is far from the case in shell-side feed modules in which flow channeling and stagnant areas between fibers, which cause significant concentration polarization problems, are difficult to avoid. Any suspended particulate matter in the feed solution is easily trapped in these stagnant areas, leading to irreversible fouling of the membrane. Baffles to direct the feed flow have been tried, but are not widely used. A more common method of minimizing concentration polarization is to direct the feed flow normal to the direction of the hollow fibers. This produces a cross-flow module with relatively good flow distribution across the fiber surface. Several membrane modules may be connected in series, so high feed solution velocities can be used. A number of variants on this basic design have been described, for example U.S. Pat. No. 3,536,611 in the name of Filipp et al., U.S. Pat. No. 5,169,530 in the name of Schucker et al., U.S. Pat. No. 5,352,361 in the name of Prasad et al., and U.S. Pat. No. 5,470,469 in the name of Eckman which are incorporated herein by reference each in its entirety. The greatest single advantage of hollow-fiber modules is the ability to pack a very large membrane area into a single module.

DESCRIPTION OF THE PREFERRED EMBODIMENTS

In order to better communicate the present invention, several preferred aspects of the multi-stage membrane separation process and apparatus of the present invention for simultaneous recovery of a very pure permeate product and a desired non-permeate product from a fluid mixture of compounds are depicted schematically in FIG. 1, FIG. 2, FIG. 3 and FIG. 4. In these preferred embodiments of the invention, the fluid feedstock is a gaseous mixture comprising a more selectively permeable alkene component and a corresponding alkane component, for example propane and propene (propylene). Other examples of light hydrocarbon compounds which are difficult to separate by traditional separtion methods, such as fractional distillation, are shown in Table I.

TABLE I

NORMAL BOILING POINT TEMPERATURES OF LIGHT HYDROCARBON COMPOUNDS

| HEAVY HYDROCARBON | B.P. ° C. | LIGHT HYDROCARBON | B.P. ° C. |
| --- | --- | --- | --- |
| Ethane | −88.5 | Ethene (ethylene) | −102.4 |
| Propane | −42.2 | Propene (propylene) | −47.7 |
| Propadiene | −34.5 | Propane | −42.2 |
| Butane | −0.6 | Methylpropene (isobutylene) | −6.6 |
| Butane | −0.6 | 1-Butene (α-butylene) | −6.47 |
| Butane | −0.6 | 1,3-Butadiene | −4.75 |
| 2-Butene (β-butylene) | 3.73 | Butane | −0.6 |
| n-Butane | −0.6 | iso-Butane | −12 |
| 1-Butene (α-butylene) | −6.47 | Methylpropene (isobutylene | −6.6 |
| 2-Butene (β-butylene) | 3.73 | Methylpropene (isobutylene | −6.6 |

The membrane staging configuration for a particular separation depends on many factors. These factors include (1) the concentration of the desired component in the feed stream; (2) the physical and chemical properties of the components being separated; (3) the required purity of the product streams; (4) the relative values of the products, which determines acceptable recovery; (5) the tradeoff between membrane capital cost and the cost of pumping or compression; and (6) how the membrane is integrated with other processing steps. In the separation of mixtures using membranes, the required product recoveries and product purity must be achieved at acceptable capital and operating costs. For multi-staged systems, the stage configuration and operating conditions of the individual stages must be balanced to meet the purity, recovery, and cost requirements.

Referring now to FIG. 1, membrane modules are disposed according to a preferred aspect of the invention in three groups represented in the drawing by modules 120, 140 and 160. A feedstock from a source 112 is passed through conduit 114, and, depending on the operating conditions employed in a particular application, an optional compressor or pump and vaporizer (not shown), into a first zone of intermediate membrane module 140.

Permeate, comprising the more selectively permeable component of the feedstock, e.g. alkene, is withdrawn from the second zone of membrane module 140 and transferred to compressor 150 through conduit 144 and manifold 146. Effluent from compressor 150 is transferred into the first zone of a first product module 160 through conduit 152. Very pure permeate product is recovered from the second zone of the first product module 160 through conduit 164.

Non-permeate effluent, comprising the less permeable component of the feedstock, e.g. alkane, is withdrawn from the first zone of the first product module 160 is recycled through conduit 162 into the first zone of intermediate membrane module 140. Non-permeate effluent, comprising the less permeable component of the feedstock, e.g. alkane, is withdrawn from the first zone of intermediate module 140 and transferred through conduit 142 into a first zone of second product module 120.

A second product, the non-permeate effluent enriched in the less permeable component of the feedstock, e.g. alkane, is withdrawn from the first zone of second module 120 through conduit 122. A permeate gas is withdrawn from the second zone of second product module 120 and transferred to the suction side of compressor 150 through conduit 124 and manifold 146. Permeate from the second product module 120 and permeate from the intermediate module 140 are thereby mixed as they pass through the compressor, and a single stream is transferred into the first zone of a first product module 160 through 152.

Figure 2:
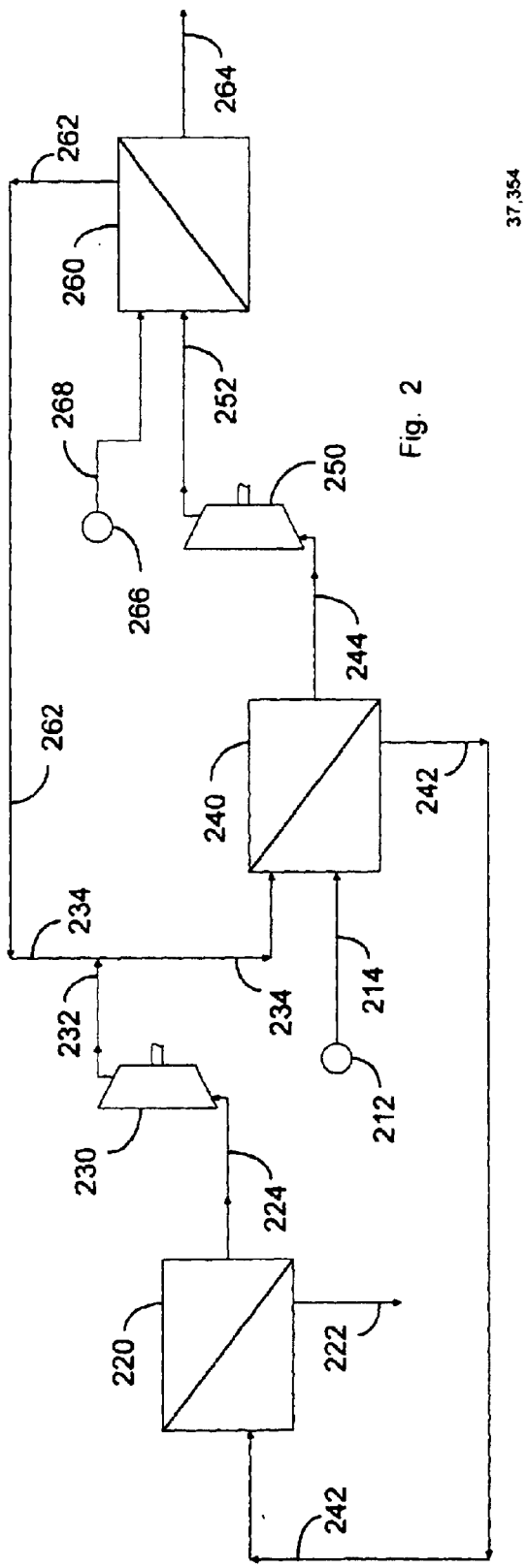
FIG. 2 is schematic drawing showing an embodiment of the present invention which includes three groups of perm-selective membrane modules, two feedstream locations and two compressors.

Referring now to FIG. 2, the membrane modules are disposed according to the invention in three groups represented in the drawing by modules 220, 240 and 260. A first feedstock which typically includes hydrocarbon compounds, such as a gaseous mixture of light hydrocarbons having from 1 to about 4 carbon atoms, from source 212, such as a steam-cacker, light-olefins upgrading unit or another refinery operation, is passed through conduit 214 and, depending on the operating conditions employed in a particular application, an optional compressor and/or pump and vaporizer (not shown), and into a first zone of intermediate membrane module 240.

Permeate, comprising the more selectively permeable alkene component of the feedstock, is withdrawn from the second zone of membrane module 240 and transferred to the suction side of compressor 250 through conduit 244 and, depending on the operating conditions employed in a particular application, an optional heat exchanger (not shown). Effluent from compressor 250 is transferred into the first zone of a first product module 260 through conduit 252. An additional feedstock which typically has a higher concentration of the alkene component than the first feedstock, from a source 266 is passed through conduit 268 and, depending on the operating conditions employed in a particular application, an optional compressor or pump and vaporizer (not shown), and into a first zone of the first product module 260. Very pure permeate product is recovered from the second zone of the first product module 260 through conduit 264.

Non-permeate effluent, comprising the less permeable alkane component of the feedstock, is withdrawn from the first zone of the first product module 260 is recycled through conduit 262 and manifold 234 into the first zone of intermediate membrane module 240. Non-permeate effluent, comprising the less permeable alkane component of the feedstock, is withdrawn from the first zone of intermediate module 240 and transferred through conduit 242 into a first zone of second product module 220.

A second product, the non-permeate effluent rich in the less permeable alkane component of the feedstock, is withdrawn from the first zone of second module 220 through conduit 222. A permeate gas is withdrawn from the second zone of second product module 220 and transferred to the suction side of compressor 230 through conduit 224 and, depending on the operating conditions employed in a particular application, an optional heat exchanger (not shown). Effluent from compressor 230 is transferred into the first zone of a intermediate module 240 through conduit 232 and manifold 234.

In other preferred embodiments of the invention, another fluid feedstock which advantageously has a concentration of the alkene component of less than the first feedstock, e.g. a steam-cracker, light-olefins upgrading unit or another refinery operation, is passed into the first zone of the second product module 220 thereby replacing or supplementing feedstock from source 212 and/or source 266.

Figure 3:
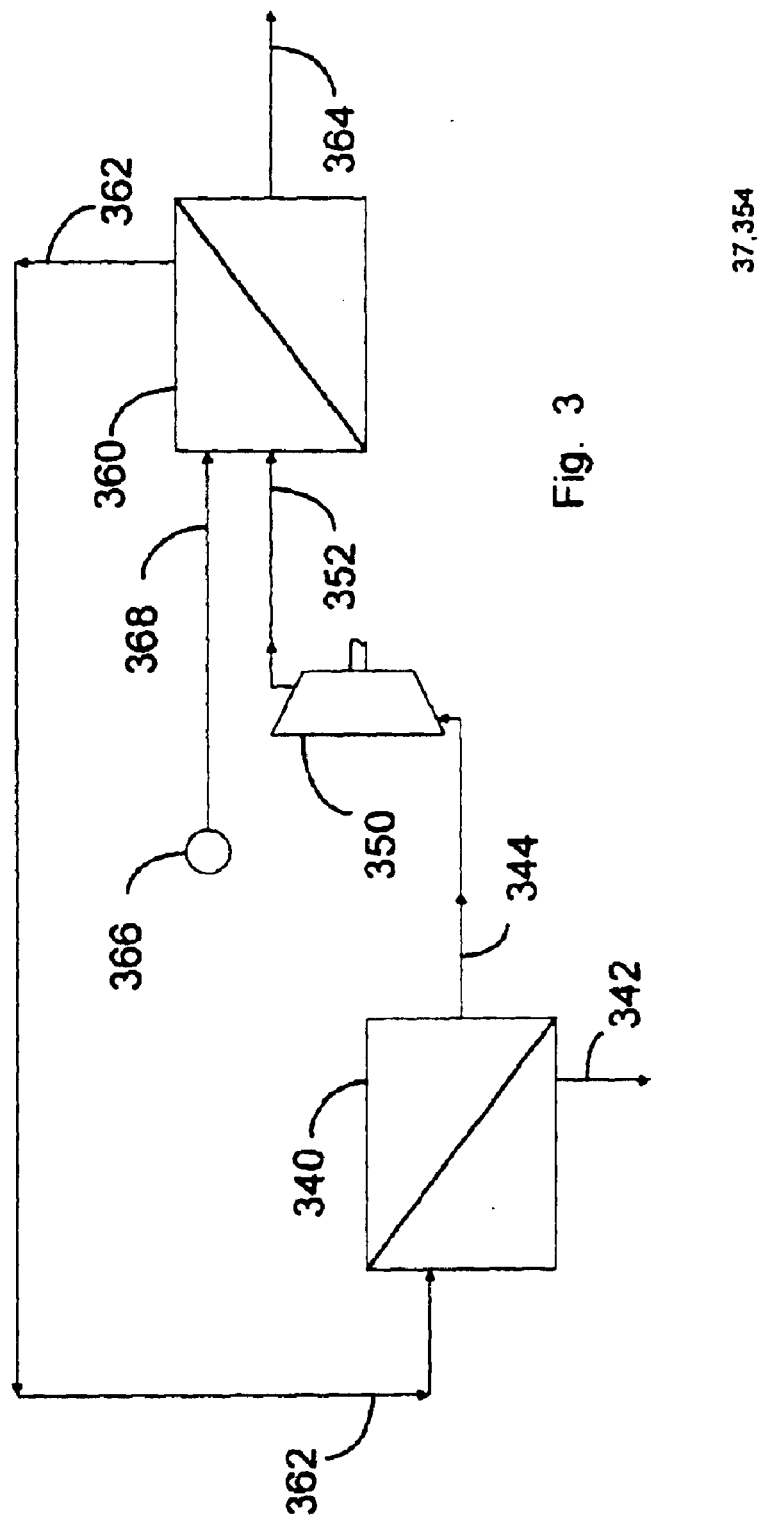
FIG. 3 and FIG. 4 are schematic flow diagrams depicting a two-stage membrane separation process of the present invention which include two groups of perm-selective membrane modules and one required compressor location, but different feedstream location.

Referring now to FIG. 3, the membrane modules having membranes of two or more different levels of selectivity are disposed according to the invention in three groups represented in the drawing by modules 320, 340 and 360. Membrane modules represented in the drawing by module 320, have membranes of lower selectivity than membranes in at least one of the other groups represented in the drawing by modules 340 and 360. More preferably, membrane modules represented in the drawing by module 320, have membranes of lower selectivity than membranes in the other groups represented in the drawing by modules 340 and 360.

A feedstock, such as a mixture of alkane and alkene hydrocarbons having from 1 to about 4 carbon atoms, from source 326, e.g., a steam-cacker, light-olefins upgrading unit or another refinery operation, is passed through conduit 328 and, depending on the operating conditions employed in a particular application an optional compressor and/or heat exchanger (not shown), and into the first zone of the second product module 320.

The non-permeate effluent rich in the less permeable alkane component of the feedstock, is withdrawn from the first zone of second module 320 through conduit 322. A permeate gas is withdrawn from the second zone of second product module 320 and transferred to compressor 330 through conduit 324 and, depending on the operating conditions employed in a particular application, an optional heat exchanger (not shown). Effluent from compressor 330 is transferred into the first zone of a intermediate module 340 through conduit 332 and manifold 334.

Permeate, comprising the more selectively permeable alkene component of the feedstock, is withdrawn from the second zone of membrane module 340 and transferred to compressor 350 through conduit 344 and, depending on the operating conditions employed in a particular application, an optional heat exchanger (not shown). Effluent from compressor 350 is transferred into the first zone of a first product module 360 through conduit 352. Very pure permeate product is recovered from the second zone of the first product module 360 through conduit 364.

Non-permeate effluent from the first zone of the first product module 360 is recycled through conduit 362 and manifold 334 into the first zone of intermediate membrane module 340. Non-permeate effluent, comprising the less permeable alkane component of the feedstock, is withdrawn from the first zone of intermediate module 340 and transferred through conduit 342 into a first zone of second product module 320.

Figure 4:
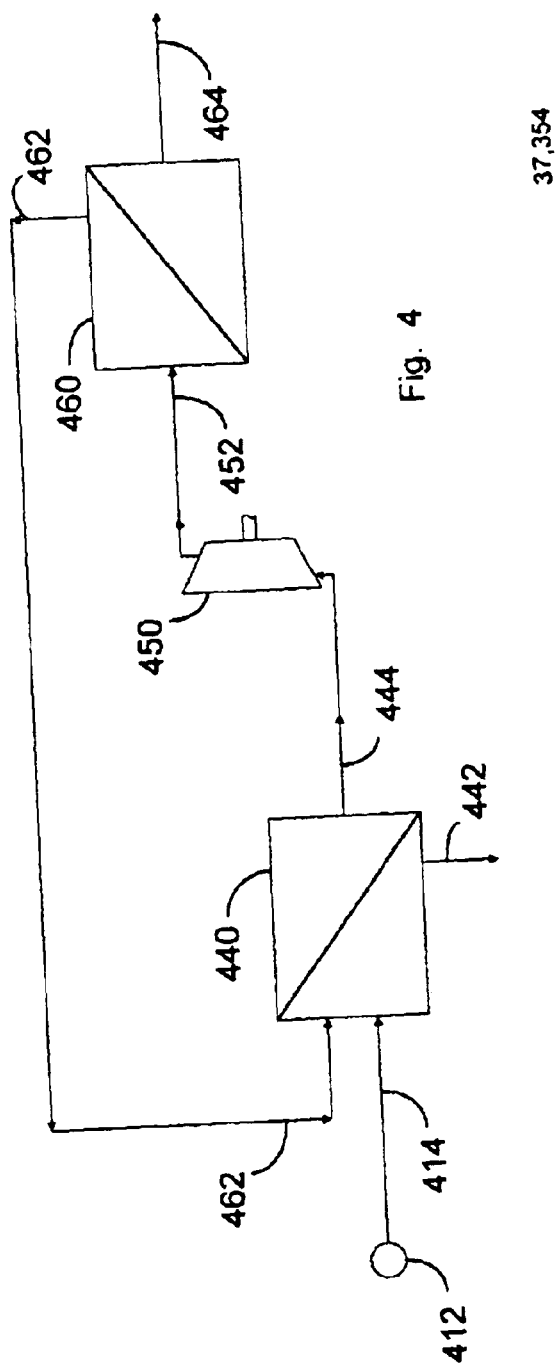

Depicted schematically in FIG. 4 is apparatus comprising a plurality of membrane modules of two classes having different levels of membrane selectivity according to which the modules are disposed in a first product group and a second product group. The two groups are represented in the drawing by modules 440 and 460. For example, cclculations were performed for the process shown in FIG. 4 using two selectivity-permeability pairs for each membrane group: a propylene selectivity of 35 and a propylene permeability of 1 Barrer in membrane group 440 and (6) a propylene selectivity of 80 and a propylene permeability of 0.08 Barrer in membrane group 460.

A feedstock which includes alkane and alkene hydrocarbon compounds, such as a gaseous mixture of hydrocarbons having from 1 to about 4 carbon atoms, from a source 412 is passed through conduit 414 and into a first zone of membrane module 440. Permeate, comprising the more selectively permeable alkene component of the feedstock, is withdrawn from the second zone of the second product module 440 and transferred to the suction side of compressor 450 through conduit 444 and, depending on the operating conditions employed in a particular application, an optional heat exchanger (not shown). Effluent from compressor 450 is transferred into the first zone of a first product module 460 through conduit 452. Very pure permeate product is recovered from the second zone of the first product module 460 through conduit 464.

Non-permeate effluent rich in the less permeable alkane component of the feedstock, is withdrawn from the first zone of first product module 460, and transferred through conduit 462 and, depending on the operating conditions employed in a particular application, an optional heat exchanger (not shown), into a first zone of second product module 440. A second product, the non-permeate effluent rich in the less permeable alkane component of the feedstock, is withdrawn from the first zone of second product module 440 through conduit 442.

EXAMPLES OF THE INVENTION

The following Examples will serve to illustrate certain specific embodiments of the herein disclosed invention. These Examples should not, however, be construed as limiting the scope of the novel invention as there are many variations which may be made thereon without departing from the spirit of the disclosed invention, as those of skill in the art will recognize.

General

These Examples demonstrate effects of different processing configurations and membrane selectivities on overall process performance for simultaneous recover of a very pure permeate product and a desired non-permeate product from a propane-propylene feedstock. The examples include the results of computer calculations, performed using commercially available chemical process modeling programs (e.g. Aspen Plus from Aspen Technology, Inc.) where models of membranes have been incorporated with standard chemical process equipment models. The models of membranes were developed by BP and based on generally accepted gas permeation equations. (See Shindo et al., "Calculation Methods for Multicomponent Gas Separation by Permeation," *Sep. Sci. Technol.* 20, 445–459 (1985), Kovvali et al., "Models and Analyses of Membrane Gas Permeators," *J. Memb. Sci.* 73, 1–23 (1992), and Coker et al., "Modeling Multicomponent Gas Separation Using Hollow-Fiber Membrane Contactors," *AIChE J.* 44, 1289–1302 (1998).)

For the purposes of the present invention, the permeability of gases through membranes is measured in "Barrer", which is defined as $10^{-10}$ [cm$^3$ (STP) cm/(cm$^2$·sec·cmHg)] and named after R. M. Barrer. Membrane permeability is a measure of the ability of a membrane to permeate a gas. The term "membrane selectivity" is defined as the ratio of the permeabilities of two gases and is a measure of the ability of a membrane to separate the two gases. (For example, see Baker, Richard W., "Membrane Technology and Applications", pp 290–291, McGraw-Hill, New York, 2000)

The feedstock compositions represent an industry average composition of catalytic or pyrolysis cracker effluents. The liquid feed was pressurized with a pump to the operating level and vaporized before introduction into the apparatus. The permeate from the non-permeate product and intermediate stages was compressed from the permeate pressure to the feed pressure before introduction to the next stage. Calculations suggested that three stage compressors with two interstage coolers (to limit compressor temperatures to 200–250° F.) were sufficient between each membrane stage. A cooler was used after each compressor to keep the feed to each membrane stage at 200° F. The final non-permeate product was condensed with 100° F. water after exiting the process. The final permeate product was compressed after exiting the process to a pressure where it could be condensed with 100° F. water (approximately 250 psia). For feedstock and other stream compositions of the present invention, the term "percent" is defined liquid percent by volume.

Calculations for these examples were performed using the following parameters:

| Parameter | Examples 1 to 9 | Examples 10 & 11 |
|---|---|---|
| Feedstock Composition | | |
| Propylene | 70 percent | 85 percent |
| Propane | 30 percent | 15 percent |
| Feedstock Flow-Rate | 10,000 BPD† | 10,000 BPD† |
| Membrane Temperature | 200° F. | 200° F. |
| Module Feed Pressure | 580 psia | 580 psia |
| Module Permeate Pressure | 40 psia | 40 psia |

†BPD is barrels per day

Example 1

Calculations were performed for the process shown in FIG. 2 using a membrane selectivity of 35 and a propylene permeability of 1 Barrer for each membrane module. In this example, feed was supplied from source 212, without feed from source 226. The results of these calculations are shown in Table II. The membrane area for the permeate product module was adjusted so that the first product met Polymer-Grade Propylene (PGP) specifications. At the same time, the membrane area for the non-permeate product module was adjusted so that the non-permeate, second product met Liquefied Petroleum Gas (LPG) specification HD-5 of the Gas Processor's Association standard 2140–92. Also the membrane area for the intermediate module was adjusted to minimize the total required compression work.

TABLE II

TOTAL COMPRESSION 0.050 kWh/lb of Permeate Product †

| MODULE | Membrane Area ($\times 10^{-3}$ ft$^2$) | Propylene Concentration (Percent) |
|---|---|---|
| Non-Permeate Product | 130 | 5.0 |
| Intermediate | 381 | |
| Permeate Product | 147 | 99.6 |

† Total is for both interstage compressors and the Permeate Product compressor.

Example 2

The calculations performed in Example 1 were repeated using a membrane selectivity of 15 and a propylene permeability of 2 Barrer for each membrane stage. A higher propylene permeability was used when selectivity was lowered because it has been noted in the membrane literature (see for example Robeson, "Correlation of Separation Factor Versus Permeability for Polymeric Membranes," *J. Memb. Sci.* 62, 165–185 (1991)) that decreasing selectivity generally leads to higher values of permeability. The results of these calculations are shown in Table II. Both PGP and LPG were simultaneously produced using the process in FIG. 2 at a selectivity of 15. However when the selectivity was lowered below approximately 10, it was not possible to make both PGP and LPG using a three-stage membrane process.

TABLE III

TOTAL COMPRESSION 0.092 kWh/lb of Permeate Product †

| MODULE | Membrane Area ($\times 10^{-3}$ ft$^2$) | Propylene Concentration (Percent) |
|---|---|---|
| Non-Permeate Product | 242 | 5.0 |
| Intermediate | 190 | |
| Permeate Product | 69 | 99.6 |

† Total is for both interstage compressors and the Permeate Product compressor.

Table III shows that the total work required in this example was 70 percent higher than that required in Example 1 at a selectivity of 35. The effect of decreasing the selectivity was to increase the amount of material that needed to be recycled within the process to meet the PGP and LPG performance specifications. Table II also shows that the total membrane area decreased in this Example by approximately 24 percent from the levels required in Example 1. This is due to the fact that a higher propylene permeability was employed in Example 2. This shows that there is a tradeoff between total compression and membrane area that is introduced when the relationship between selectivity and permeability is considered. The relationship between compression costs and membrane costs will determine whether higher selectivity or higher permeability is desirable.

Example 3

This example is based upon the preferred embodiment of the invention depicted in FIG. 2, except that feed streams supplied from source 212 and source 266 were replaced with a single feed (not shown) which was introduced into the apparatus at a different location, i.e., into the first zone of the second product module 220. As before, the membrane area for the permeate product and non-permeate product modules were adjusted so that the alkene and alkane products met the PGP and LPG specifications, respectively, and the membrane area for the Intermediate module was adjusted to minimize the total required compression work.

Table IV shows that the position where the feed is introduced greatly influences the compression and membrane area requirements needed to meet the PGP and LPG specifications.

TABLE IV

TOTAL COMPRESSION 0.088 kWh/lb of Permeate Product †

| MODULE | Membrane Area ($\times 10^{-3}$ ft$^2$) | Propylene Concentration (Percent) |
|---|---|---|
| Non-Permeate Product | 1930 | 5.0 |
| Intermediate | 338 | |
| Permeate Product | 147 | 99.6 |

† Total is for both interstage compressors and the Permeate Product compressor.

Example 4

This example documents an aspect of the preferred embodiment of the invention depicted in FIG. 1. Feed was supplied to modules 140 from source 112. Membrane propylene selectivity of 35 and a propylene permeability of 1 Barrer in each of membrane modules were used for these calculations.

Membrane area for the non-permeate product modules and the permeate product modules were adjusted so that the final permeate product stream 164 met Polymer-Grand Propylene (PGP) specifications and, at the same time, the final non-permeate product steam 122 met Liquefied Petroleum Gas(LPG)specification HD-5 of the Gas Processor's Association standard 2140–92. Also the membrane area for the intermediate modules 140 was adjusted to minimize the total required compression work, which is a major cost driver. The results of these calculations are shown in Table V. When the membrane selectivity dropped below about 25, the flow of material in stream 124 increased and the concentration of propylene in stream 152 decrease so much that it was no longer possible to make a final permeate product which met PGP specifications. At these lower membrane selectivities, an apparatus similar to that shown in FIG. 2, where the permeate from the non-permeate product stage is directed to an intermediate stage is required.

TABLE V

TOTAL COMPRESSION 0.055 kWh/lb of Permeate e Product †

| MODULE | Membrane Area (× $10^{-3}$ $ft^2$) | Propylene Concentration, Percent |
|---|---|---|
| Non-Permeate Product | 121 | 5.0 |
| Intermediate | 415 | |
| Permeate Product | 156 | 99.6 |

† Total is for both interstage compressors and the Permeate Product compressor.

It was not possible to meet the PGP and LPG requirements using the process shown in FIG. 1 at selectivities below 25. In comparing Table II and Table III, decreasing the selectivity of the membranes greatly increases the amount of area employed in the non-permeate product module relative to the total amount of area needed. Thus the effect of bypassing the permeate of the non-permeate product module around the intermediate module was much more severe at lower selectivities.

Comparative Examples 5 & 6

Calculations were performed for the process shown in FIG. 4 using two selectivity-permeability pairs for each membrane group: (5) a propylene selectivity of 35 and a propylene permeability of 1 Barrer and (6) a propylene selectivity of 80 and a propylene permeability of 0.08 Barrer. The propylene permeability was again lowered as propylene selectivity increased to match the trend between these two variables typically observed for membranes. The amount of membrane area in the permeate product module was adjusted so the final permeate product composition always met the specifications for PGP. The amount of membrane area in the non-permeate product module was then varied and the flowrates, compositions, and energy requirements of the process were monitored.

The results of these calculations are shown in Table VI and Table VII. As the non-permeate product module membrane area was increased, the amount of recycle required to make the final permeate product meet the PGP specification increased. The work requirements of the compressor between the non-permeate and permeate modules also increased as the non-permeate product module membrane area and the amount of recycle increased. The results shown were evaluated at the minimum propylene concentration in the non-permeate product.

The propylene content of the final non-permeate product went through a minimum as the membrane area of non-permeate product module and the recycle rate was increased. Once this minimum was achieved, it was not possible to decrease the propylene content of the final non-permeate product further by increasing membrane area or recycle. Note that it was not possible to make an final non-permeate product that met the LPG specification for propylene selectivities below about 80 using a two-stage process.

Table VI and Table VII shows that the membrane area and total compressor work required at both propylene selectivities were quite high for the process shown in FIG. 4.

TABLE VI

TOTAL COMPRESSION 0.056 kWh/lb of Permeate Product †

| PRODUCT | 35/1 Membrane Area (× $10^{-3}$ $ft^2$) | Propylene Concentration (Percent) |
|---|---|---|
| Non-permeate | 12100 | 6.0 |
| Permeate | 153 | 99.5 |

† Total is interstage compressor and the Permeate Product compressor.

TABLE VII

TOTAL COMPRESSION 0.052 kWh/lb of Permeate Product †

| PRODUCT | 80/0.08 Membrane Area (× $10^{-3}$ $ft^2$) | Propylene Concentration (Percent) |
|---|---|---|
| Non-permeate | 563000 | 5.0 |
| Permeate | 2270 | 99.5 |

† Total is interstage compressor and the Permeate Product compressor.

Example 7

Calculations were performed for the process shown in FIG. 3 using a propylene selectivity of 35 and a propylene permeability of 1 Barrer for each membrane stage. The results of these calculations are shown in Table VIII. The membrane area for the permeate product stage was adjusted so that the permeate stage product met Chemical-Grade Propylene (CGP) specifications. At the same time, the membrane area for the non-permeate product stage was adjusted so that the non-permeate stage product met LPG specifications.

TABLE VIII

SEPARATIONS USING MEMBRANE MODULES DISPOSED IN TWO GROUPS

| TOTAL COMPRESSION | AREA OF MEMBRANES 1,000 sq ft | NON-PERMEATE PRODUCT, Percent Propylene | PERMEATE PRODUCT, Percent Propylene |
|---|---|---|---|
| 0.020 | 467 | 5.0 | 94 |

† Total is for the interstage compressor and the propylene product compressor in kWh/lb of Permeate Product.

Example 8

The calculations performed in Example 7 were repeated using a propylene selectivity of 15 and a propylene permeability of 2 Barrer for each membrane stage. The results of these calculations are shown in Table IX. Both CGP and LPG were simultaneously produced using the process in FIG. 3 at a propylene selectivity of 15.

TABLE IX

SEPARATIONS USING MEMBRANE MODULES DISPOSED IN TWO GROUPS

| TOTAL COMPRESSION | AREA OF MEMBRANES 1,000 sq ft | NON-PERMEATE PRODUCT, Percent Propylene | PERMEATE PRODUCT, Percent Propylene |
|---|---|---|---|
| 0.030 | 303 | 5.0 | 94 |

† Total is for the interstage compressor and the propylene product compressor in kWh/lb of Permeate Product.

Example 9

Calculations were performed for the process shown in FIG. 4 using a propylene selectivity of 35 and a propylene permeability of 1Barrer for each membrane stage. The membrane areas of the non-permeate product and permeate product stages were again adjusted to simultaneously meet the LPG and CGP specifications, respectively. The results of these calculations are shown in Table X Table X shows that the total compression work and the amount of membrane required for the process shown in FIG. 4 at a selectivity of 35 was much higher than that required for the process shown in FIG. 3 at a propylene selectivity of 35. The only difference between the processes shown in FIG. 3 and FIG. 4 is the position in the process where the feed is introduced. The calculations indicated that the position where the feed is introduced greatly influences the compression and membrane area requirements needed to meet the CGP and LPG specifications.

TABLE X

SEPARATIONS USING MEMBRANE MODULES DISPOSED IN TWO GROUPS

| TOTAL COMPRESSION | AREA OF MEMBRANES 1,000 sq ft | NON-PERMEATE PRODUCT, Percent Propylene | PERMEATE PRODUCT, Percent Propylene |
|---|---|---|---|
| 0.054 | 2285 | 5.0 | 94 |

† Total is for the interstage compressor and the propylene product compressor in kWh/lb of Permeate Product.

Example 10 & 11

Calculations in Examples 10 and 11 were performed at the same total feed flow-rate but with a different feed composition than those in Examples 1 to 9. The effect of this difference is that there is more propylene and less propane to process in Examples 10 and 11 than Examples 1 to 9. Thus comparisons in total compression between examples in Examples 1 to 9 and Examples 10 and 11 were done on a unit of final permeate product basis.

Example 10

Calculations were performed for the process shown in FIG. 2 using a propylene selectivity of 35 and a propylene permeability of 1 Barrer for each membrane stage. The membrane areas of the permeate and non-permeate modules were again adjusted to simultaneously meet the PGP and LPG specifications, respectively, and the area of the intermediate module was adjusted to minimize the total compressor work required. Table XI shows the results of these calculations. The total compression in Table XI is 14 percent lower than the total compression in Example 1. The required membrane area in Table X is 13 percent lower than the required membrane area in Example 1. Thus changing the feed composition resulted in similar decreases for both the membrane area and total compression. These calculations show that less compression and membrane area is needed to meet the PGP and LPG specifications using the process shown in FIG. 2 when the propylene content of the feed is higher.

Example 11

The calculations performed in Example 10 were repeated using the process shown in FIG. 2, where the feed stream from source 212 and source 266 has been replaced with a single feed which is introduced into the first zone of the second product module 220. Table XII shows the results of these calculations. As was seen in Example 10, it appeared that less compression and membrane area was needed to meet the PGP and LPG specifications when the propylene content of the feed was higher.

TABLE XI

TOTAL COMPRESSION 0.048 kWh/lb of Permeate Product †

| MODULE | Membrane Area ($\times 10^{-3}$ ft$^2$) | Propylene Concentration (Percent) |
|---|---|---|
| Non-Permeate Product | 61 | 5.0 |
| Intermediate | 329 | |
| Permeate Product | 182 | 99.6 |

† Total is for both interstage compressors and the Propylene Product compressor.

TABLE XII

TOTAL COMPRESSION 0.087 kWh/lb of Permeate Product †

| MODULE | Membrane Area ($\times 10^{-3}$ ft$^2$) | Propylene Concentration (Percent) |
|---|---|---|
| Non-Permeate Product | 2350 | 5.0 |
| Intermediate | 415 | |
| Permeate Product | 182 | 99.6 |

† Total is for both interstage compressors and the Permeate Product compressor.

In comparing the total compression results of Examples 1, 3, 10 and 11 it can be seen that the process shown in FIG. 2 results in the lowest amount of total compression required to meet the PGP and LPG specifications regardless of feed propylene content.

Example 12

This example documents an aspect of the preferred embodiment of the invention depicted in FIG. 2 where only the feed stream from source 212 was introduced into the apparatus, and the membrane modules had different membrane properties. In particular, two propylene permeability-selectivity pairs were used in these calculations: propylene permeability of 2 Barrer with 15 propylene selectivity and propylene permeability of 1 Barrer with 35 propylene selectivity.

The membrane area for the permeate product module was adjusted so that the final permeate product met Polymer-Grade Propylene (PGP) specifications. At the same time, the membrane area for the final non-permeate product module was adjusted so that the final non-permeate product met Liquefied Petroleum Gas (LPG) specification HD-5 of the Gas Processor's Association standard 2140–92. Also the membrane area for the intermediate module was adjusted to minimize the total required compression work.

The results of these calculations are shown in Table XIII. These results show that less energy and more membrane area are required when higher selectivity membranes are used. However these results show the unexpected result that exactly how much less energy is required depends on the stage in which the higher selectivity membrane is employed. Note that using the membranes with a propylene selectivity of 35 in the intermediate or permeate product modules stages reduces the energy required to about 30 percent of the energy required using membranes with a propylene selectivity of 15 in each stage while requiring an increase in membrane area of only approximately 5 percent. Using membranes with propylene selectivities of 35 in the intermediate and permeate product modules requires about the same amount of energy as using membranes with propylene selectivities of 35 in all three stages while using approximately 10 percent less membrane area. These results suggest that the energy and membrane area requirements can be adjusted by using different selectivities in each stage.

TABLE XIII

SEPARATIONS USING MEMBRANES HAVING TWO LEVELS OF SELECTIVITY ACCORDING TO WHICH THE MODULES ARE DISPOSED INTO THREE GROUPS

| DISPOSITION OF MEMBRANE SELECTIVITY† | TOTAL COMPRESSION†† | MEMBRANE AREA, 1,000 sq ft | REDUCTION OF ENERGY REQUIRED, Percent |
|---|---|---|---|
| 15 - 15 - 15 | 0.084 | 510 | 0.0 |
| 35 - 35 - 35 | 0.050 | 675 | 40.5 |
| 15 - 35 - 35 | 0.051 | 607 | 39.3 |
| 35 - 15 - 35 | 0.058 | 684 | 31.0 |
| 35 - 35 - 15 | 0.056 | 701 | 33.3 |
| 35 - 15 - 15 | 0.078 | 978 | 7.1 |
| 15 - 35 - 15 | 0.059 | 537 | 29.8 |
| 15 - 15 - 35 | 0.061 | 528 | 27.4 |

†Disposition in order of Non-Permeate Product Module - Intermediate Module - Permeate Product Module.
††Total is for both interstage compressors and the final permeate product compressor, k Wh/lb permeate product.

For the purposes of the present invention, "predominantly" is defined as more than about fifty percent. "Substantially" is defined as occurring with sufficient frequency or being present in such proportions as to measurably affect macroscopic properties of an associated compound or system. Where the frequency or proportion for such impact is not clear, substantially is to be regarded as about twenty per cent or more. The term "essentially free of" is defined as absolutely except that small variations which have no more than a negligible effect on macroscopic qualities and final outcome are permitted, typically up to about one percent.

That which is claimed is:

1. A process using perm-selective membranes in multiple groups for simultaneous recovery of a permeate product and a desired non-permeate product from a fluid mixture of compounds, which process comprises:

(1-a) providing a feedstream comprising a mixture of an alkane compound having from 2 to about 4 carbon atoms and an alkene compound having the same number of carbon atom as the predominate component of the feedstream, (1-b) providing apparatus comprising a plurality of membrane modules each including first and second zones separated by a solid perm-selective membrane which under a suitable differential of a driving force exhibits a permeability of at least 0.1 Barrer for one of the compounds of the feedstock, each first zone having at least one inlet and outlet for flow of fluid in contact with the membrane, and contiguous with the opposite side thereof a second zone having at least one outlet for flow of permeate, and the membrane modules of the apparatus are disposed in a first product group, a second product group, and at least one intermediate group, which intermediate group has membranes of higher selectivity than the membranes in at least one of the other groups, (1-c) introducing the feedstream into the first zone of one or more of the intermediate modules under conditions suitable for permeation, and thereby obtaining permeate effluents and non-permeate streams from the intermediate modules, (1-d) distributing the non-permeate streams from the intermediate modules into the first zone of one or more of the second product modules under conditions suitable for permeation, (1-e) collecting the permeate effluents from the second zones of the intermediate group of modules and distributing the permeates into the first zones of the first product group modules under conditions suitable for permeation, thereby obtaining non-permeate streams and final permeate product streams from the first product modules, and (1-f) distributing the non-permeate streams from the first product modules into the first zone of one or more of the intermediate modules under conditions suitable for permeation.

2. The process according to claim 1 which further comprises:

(2-g) collecting the permeate effluents from the second zones of the second product modules and distributing the permeates into the first zones of the first product group modules.

3. The process according to claim 1 which further comprises:

(3-g) collecting the permeate effluents from the second zones of the second product modules and distributing the permeates into the first zones of the intermediate group of modules.

4. The process according to claim 1 wherein the membrane modules in at least a portion of the intermediate group have membranes of higher selectivity than membranes in at least one of the other groups.

5. A process using perm-selective membranes in multiple groups for simultaneous recovery of a permeate product and a desired non-permeate product from a fluid mixture of compounds, which process comprises:

(5-a) providing a feedstream comprising a mixture of an alkane compound having from 2 to about 4 carbon atoms an alkene compound having the same number of carbon atoms as the predominate component of the feedstream, and a liquid volume ratio of the alkene to the alkane in a range of from about 1.5 to about 4, (5-b) providing apparatus comprising a plurality of membrane modules disposed in a first product group, one or more intermediate group, and a second product group, each module comprising first and second zones separated by a solid perm-selective membrane which under a suitable differential of a driving force exhibits a permeability of at least 0.1 Barrer for one of the compounds of the feedstock, each first zone having at least one inlet and outlet for flow of fluid in contact with the membrane, and contiguous with the opposite side thereof a second zone having at least one outlet for flow of permeate, (5-c) introducing the feedstream into the first zone of one or more of the intermediate modules under conditions suitable for permeation, and thereby obtaining permeate effluents and non-permeate streams from the intermediate modules, (5-d) collecting the permeate effluents from the second zones of one or more of the intermediate group modules, and distributing the permeates into the first zones of the first product group modules, under conditions suitable for permeation, and thereby separating therefrom non-permeate effluents and final permeate product streams, (5-e) distributing the non-permeate streams from one or more of the intermediate modules into the first zone of the second product modules under conditions suitable for permeation, and thereby obtaining permeate effluents and non-permeate second product streams from the second product modules, (5-f) collecting the permeate effluents from the second zones of the second product modules, and distributing the permeates into the first zones of the first product group of modules, and (5-g) distributing the non-permeate streams from the first product modules into the first zone of one or more of the intermediate modules.

6. The process according to claim 5 wherein the mixture comprises propylene and propane.

7. The process according to claim 3 wherein the membrane modules in the second product group have membranes of lower selectivity than membranes in at least one of the other groups.

8. The process according to claim 5 wherein the membrane modules in at least a portion of the intermediate group have membranes of higher selectivity than membranes in the other groups.

9. The process according to claim 5 wherein the membrane modules in the first product group have membranes of higher selectivity than membranes in at least one of the other groups.

10. The process according to claim 5 wherein the fluid in contact with the membranes in one or more of the module groups is liquid, gas, or a combination thereof.

11. A process using perm-selective membranes in multiple groups for simultaneous recovery of a permeate product and a desired non-permeate product from a fluid mixture of compounds, which process comprises:

(11-a) providing a feedstream comprising a mixture of an alkane compound having from 2 to about 4 carbon atoms and an alkene compound having the same number of carbon atoms as the predominate component of the feedstream, and a liquid volume ratio of the alkene to the alkane in a range of from about 1.5 to about 4, (11-b) providing apparatus comprising a plurality of membrane modules each including first and second zones separated by a solid perm-selective membrane which under a suitable differential of a driving force exhibits a permeability of at least 0.1 Barrer for one of the compounds of the feedstock, each first zone having at least one inlet and outlet for flow of fluid in, contact with the membrane, and contiguous with the opposite side thereof a second zone having at least one outlet for flow of permeate, and the membrane modules of the apparatus are disposed in a first product group, a second product group, and at least one intermediate group, which intermediate group has membranes of higher selectivity than the membranes in at least one of the other groups, (11-c) introducing the feedstream into the first zone of one or more of the intermediate and first product modules under conditions suitable for permeation, and thereby obtaining permeate effluents and non-permeate streams from the intermediate modules, (11-d) collecting the permeate effluents from the second zones of one or more of the intermediate group modules, and distributing the permeates into the first zones of the first product group modules, under conditions suitable for permeation, and thereby separating therefrom non-permeate effluents and final permeate product streams, (11-e) distributing the non-permeate streams from one or more of the intermediate modules into the first zone of the second product modules under conditions suitable for permeation, and thereby obtaining permeate effluents and non-permeate second product streams from the second product modules (11-f) collecting the permeate effluents from the second zones of the second product modules, and distributing the permeates into the first zones of one or more of the intermediate group modules, and (11-g) distributing the non-permeate streams from the first product modules into the first zone of one or more of the intermediate modules under conditions suitable for permeation.

12. The process according to claim 11 wherein the mixture comprises propylene and propane.

13. The process according to claim 11 wherein the fluid in contact with the membranes in one or more of the module groups is liquid, gas, or a combination thereof.

14. A process using penn-selective membranes in groups for simultaneous recovery of a permeate product and a desired non-permeate product from a fluid mixture of compounds, which process comprises:

(14-a) providing a feedstream comprising a mixture of an alkane compound having from 2 to about 4 carbon atoms and an alkene compound having the same number of carbon atoms as the predominate component of the feedstream, (14-b) providing apparatus comprising a plurality of membrane modules disposed in a first product group and a second product group, each module comprising first and second zones separated by a solid perm-selective membrane which under a suitable differential of a driving force exhibits a permeability of at least 1 Barrer for one of the compounds of the feedstock, each first zone having at least one inlet and outlet for flow of fluid in contact with the membrane, and contiguous with the opposite side thereof a second zone having at least one outlet for flow of permeate, (14-c) introducing the feedstream into the first zone of the first product group of modules under conditions suitable for permeation, and thereby obtaining non-permeate effluents and final permeate product streams from the first product modules, (14-d) collecting the non-permeate effluents from the second zones of the first product group modules, and distributing the non-permeate streams into the first zone of the second product modules under conditions suitable for permeation, and thereby obtaining permeate effluents and non-permeate second product streams from the second product modules, and (14-e) collecting the permeate effluents from the second zones of the second product group of modules, and distributing the permeates into the first zones of the first product group modules.

15. The process according to claim 14 wherein the mixture has a liquid volume ratio of the alkene to the alkane compounds, and ratio is in a range of from about 1.5 to about 4.

16. The process according to claim 15 wherein the mixture comprises propylene and propane.

17. The process according to claim 14 wherein the fluid in contact with the membranes in one or more of the module groups is liquid, gas, or a combination thereof.

* * * * *